(12) United States Patent  
Ye et al.

(10) Patent No.: US 11,921,665 B2  
(45) Date of Patent: Mar. 5, 2024

(54) SERVER SYSTEM AND METHOD FOR DETECTING CORRECTNESS OF CONNECTIONS THEREIN

(71) Applicant: Shenzhen Fulian Fugui Precision Industry Co., Ltd., Shenzhen (CN)

(72) Inventors: Shan-Shan Ye, Shenzhen (CN); Li-Wen Guo, Shenzhen (CN); Fan Li, Shenzhen (CN)

(73) Assignee: Shenzhen Fulian Fugui Precision Industry Co., Ltd., Shenzhen (CN)

( * ) Notice: Subject to any disclaimer, the term of this patent is extended or adjusted under 35 U.S.C. 154(b) by 0 days.

(21) Appl. No.: 17/887,616

(22) Filed: Aug. 15, 2022

(65) Prior Publication Data

US 2023/0334004 A1  Oct. 19, 2023

(30) Foreign Application Priority Data

Apr. 19, 2022 (CN) .......................... 202210409598.4

(51) Int. Cl.  
*G06F 13/42* (2006.01)  
*G06F 13/40* (2006.01)

(52) U.S. Cl.  
CPC .......... *G06F 13/42* (2013.01); *G06F 13/4027* (2013.01)

(58) Field of Classification Search  
CPC .............................. G06F 13/42; G06F 13/4027  
See application file for complete search history.

(56) References Cited

U.S. PATENT DOCUMENTS

| | | | | |
|---|---|---|---|---|
| 5,592,881 A | * | 1/1997 | Rabjohns | G06F 11/006 270/58.01 |
| 7,231,540 B2 | * | 6/2007 | Morimoto | H01R 13/514 714/27 |
| 7,314,392 B2 | * | 1/2008 | Pharn | H01R 13/641 439/489 |
| 11,184,992 B1 | * | 11/2021 | Tsai | H05K 7/1492 |
| 2001/0016891 A1 | * | 8/2001 | Hagino | G06F 13/385 710/305 |
| 2011/0145444 A1 | * | 6/2011 | Dai | G06F 13/385 710/16 |
| 2016/0255740 A1 | * | 9/2016 | Ping | G06F 1/16 710/301 |
| 2020/0097429 A1 | * | 3/2020 | Kiener | H04Q 1/13 |
| 2022/0255812 A1 | * | 8/2022 | Okabe | G06K 7/1413 |

FOREIGN PATENT DOCUMENTS

| | | |
|---|---|---|
| CN | 205910643 U | 1/2017 |
| TW | 202202982 A | 1/2022 |

* cited by examiner

*Primary Examiner* — Nimesh G Patel  
(74) *Attorney, Agent, or Firm* — ScienBiziP, P.C.

(57) ABSTRACT

A server system with inbuilt ability to determine the correctness of connections within the server and prevent operation in the event of a misconnection includes a server motherboard, a connection cable, and a server backplane. The server backplane is electrically connected to the server motherboard through the connection cable. The connection cable comprises a first connector and a second connector, the first connector and the second connector are configured to connect to the server motherboard, the first connector and the second connector carry their own individual binary IDS, and the server motherboard is configured to determine whether the connection cable is correctly connected according to the binary IDs. The present disclosure also provides a method for same.

20 Claims, 5 Drawing Sheets

SERVER SYSTEM AND METHOD FOR DETECTING CORRECTNESS OF CONNECTIONS THEREIN

TECHNICAL FIELD

The present disclosure relates to the technical field of big data computing platform, in particular to a server system and detection method thereof.

BACKGROUND

In general, a motherboard of a server will use connecting cables to connect with other devices. When there are multiple connectors with the same or similar shape but different signals being transmitted from one end of the connecting cable, there may be error in the connections. The interfaces on the server motherboard are close together, when the connecting cable is used to connect the server motherboard and other devices, the connector on the connecting cable may be connected in reverse or wrongly, which will cause the server system to fail to operate normally.

Therefore, improvement is desired.

DETAILED DESCRIPTION

The technical solutions in the embodiments of the present disclosure will be described in conjunction with the accompanying drawings in the embodiments of the present disclosure. Obviously, the described embodiments are part of the embodiments of the present disclosure, not all of them. Based on the embodiments of the present disclosure, all other embodiments obtained by those of ordinary skill in the art without creative work shall fall within the protection scope of the present disclosure. The terms used in the description of the present disclosure herein are only for the purpose of describing specific embodiments and are not intended to limit the present disclosure.

In the embodiment of the present disclosure, "first", "second" and other terms are only used for the purpose of distinguishing between descriptions and cannot be understood as indicating or implying relative importance, or as indicating or implying order. The features defined as "first" and "second" may include one or more of the features explicitly or implicitly. In the description of the embodiments of the present disclosure, the terms "exemplary" or "for example" are used as examples or explanations. Any embodiment or design described as "exemplary" or "for example" in the embodiments of the present disclosure shall not be interpreted as being more preferred or advantageous than other embodiments or designs.

In the article, unless otherwise expressly specified and limited, for location terms, the terms "above", "below", "upper end", "lower end", "lower surface", "clockwise", "counterclockwise", "left", "right" and so on indicate that the location and position relationship are based on the location or position relationship shown in the attached drawings, and are used only for the convenience of description and simplifying the description, rather than indicating or implying that the device or element referred to must have a specific orientation, be constructed and operated in a specific orientation, it cannot be understood as limiting the specific scope of protection of the present disclosure.

In the article, unless otherwise expressly specified and limited, the terms "first" and "second" are only used for descriptive purposes and cannot be understood as indicating or implying relative importance or implicitly indicating the number of technical features. Thus, features defined as "first" and "second" can explicitly or implicitly include one or more of the features.

Some embodiments of the present disclosure are described in detail below in combination with the accompanying drawings. Without conflict, the following embodiments and features in the embodiments can be combined with each other.

Figure 1:
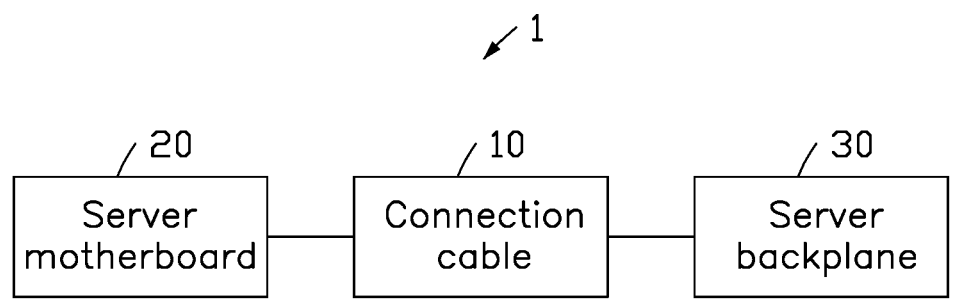
FIG. 1 is a schematic diagram of a server system according to an embodiment of the present disclosure.

FIG. 1 illustrates a server system 1 in accordance with an embodiment of the present disclosure.

The server system 1 includes a connection cable 10, a server motherboard 20, and a server backplane 30. The server motherboard 20 is connected to the server backplane 30 through the connection cable 10.

Figure 2:
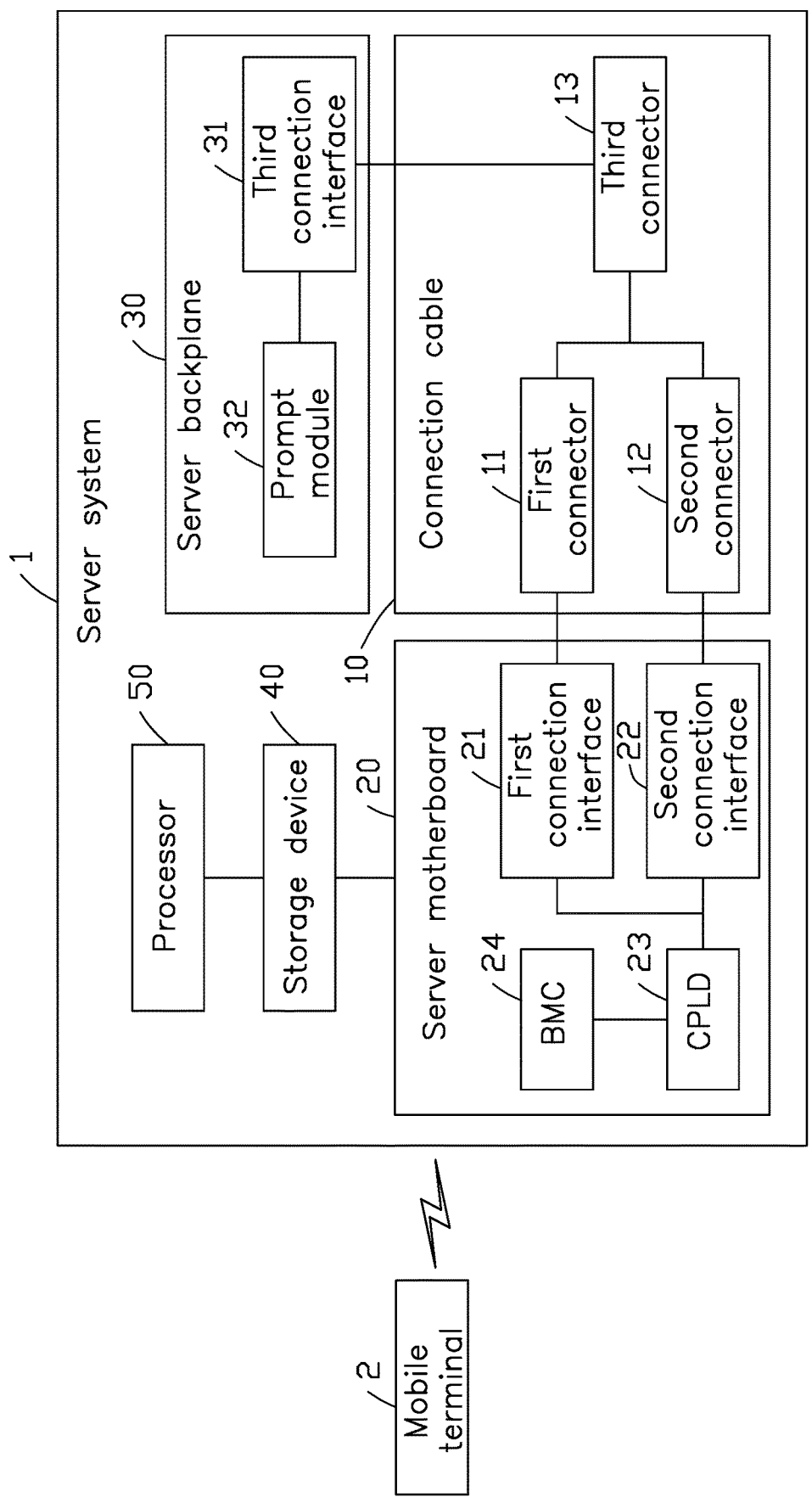
FIG. 2 is a schematic diagram showing a correct connection of cables in the server system according to an embodiment of the present disclosure.

Referring to FIG. 2, the server motherboard 20 includes at least two connection interfaces, such as a first connection interface 21 and a second connection interface 22. The server backplane 30 includes a connection interface, such as the third connection interface 31.

In the embodiment, the first connection interface 21 and the second connection interface 22 of the server motherboard 20 transmit different signals. The first end of the connection cable 10 is provided with at least two connectors, such as a first connector 11 and a second connector 12. The second end of the connection cable 10 is provided with a connector, such as a third connector 13.

In the embodiment, the first connector 11 and the second connector 12 are connectors that transmit different signals. The first connector 11 and the second connector 12 have binary IDs which are different. Specifically, the binary ID of the first connector 11 can be set as the first ID, and the binary ID of the second connector 12 can be set as the second ID.

In the embodiment, the correct connections of the connection cable 10 are that the first connection interface 21 is connected to the first connector 11, the second connection interface 22 is connected to the second connector 12, and the third connection interface 31 is connected to the third connector 13. Therefore, the server system 1 has a preset signal according to the states of the connections of the connection cable 10.

In the embodiment, the preset signal can be set as a binary ID, that is, a third ID, which is the first ID and the second ID successively combined.

The server motherboard 20 further includes a complex programmable logic device (CPLD) 23 and a baseboard management controller (BMC) 24.

The CPLD 23 is used to read the binary ID of the connector connected to the server motherboard 20 and determine whether the binary ID of the connector connected to the server motherboard 20 is consistent with the preset signal configured by the server system 1. That is, the CPLD 23 determines whether the connection cable 10 is connected correctly. When the CPLD 23 determines that the connection cable 10 is connected incorrectly, the BMC 24 sends a warning signal and transmits the signal to the server backplane 30.

In some embodiments, the server system 1 is also connected to the mobile terminal 2. For example, the server motherboard 20 is connected to the mobile terminal 2. The BMC 24 can also send a warning signal to mobile terminal 2 to prompt that the connection cable 10 is connected incorrectly. It is understandable that mobile terminal 2 can be, but is not limited to, mobile phones, tablets, laptops, computers, which are not specifically limited here.

The server backplane 30 includes a prompt module 32, the prompt module 32 is used to receive the warning signal fed back by the BMC 24. When the prompt module 32 receives the signal fed back by the BMC 24, the prompt module 32 will adjust its display state according to the signal. For example, in the embodiment, when the connection cable 10 is connected correctly, the prompt module 32 does not receive a warning signal fed back by the BMC 24, and the prompt module 32 displays the first state. When the connection cable 10 is connected incorrectly, the prompt module 32 receives the warning signal fed back by the BMC 24, and the prompt module 32 displays the second state.

The prompt module 32 may be a light emitting diode (LED) module. When the connection cable 10 is connected correctly, the prompt module 32 can be set to not emit light. When the connection cable 10 is connected incorrectly, the prompt module 32 can be set to the light-emitting state. Therefore, the present disclosure can quickly obtain the connection status of the connection cable 10 on the server motherboard 20 by observing the display of the prompt module 32.

In the embodiment, taking the binary ID of the first connector 11 as binary 10 and the binary ID of the second connector 12 as binary 01 as examples, the operating process of the server system 1 is explained.

When the binary ID of the first connector 11 is binary 10 and the binary ID of the second connector 12 is binary 01, the preset signal of the server system 1 can be configured as binary 1001.

FIG. 2 is a schematic diagram of the correct connections of the connection cable 10 in accordance with an embodiment of the present disclosure. When the connection cable 10 is correctly connected, the first connection interface 21 is connected to the first connector 11, and the second connection interface 22 is connected to the second connector 12. When the server motherboard 20 is powered on, the CPLD 23 reads the four-bit binary as 1001. Then, the CPLD 23 determines that the four-bit binary 1001 is consistent with the preset signal (1001) configured by the server system 1, indicating that the connection cable 10 is connected correctly. Therefore, the CPLD 23 controls the operation of the server backplane 30. At the same time, the prompt module 32 displays the first state, for example, the prompt module 32 does not emit light.

Figure 3:
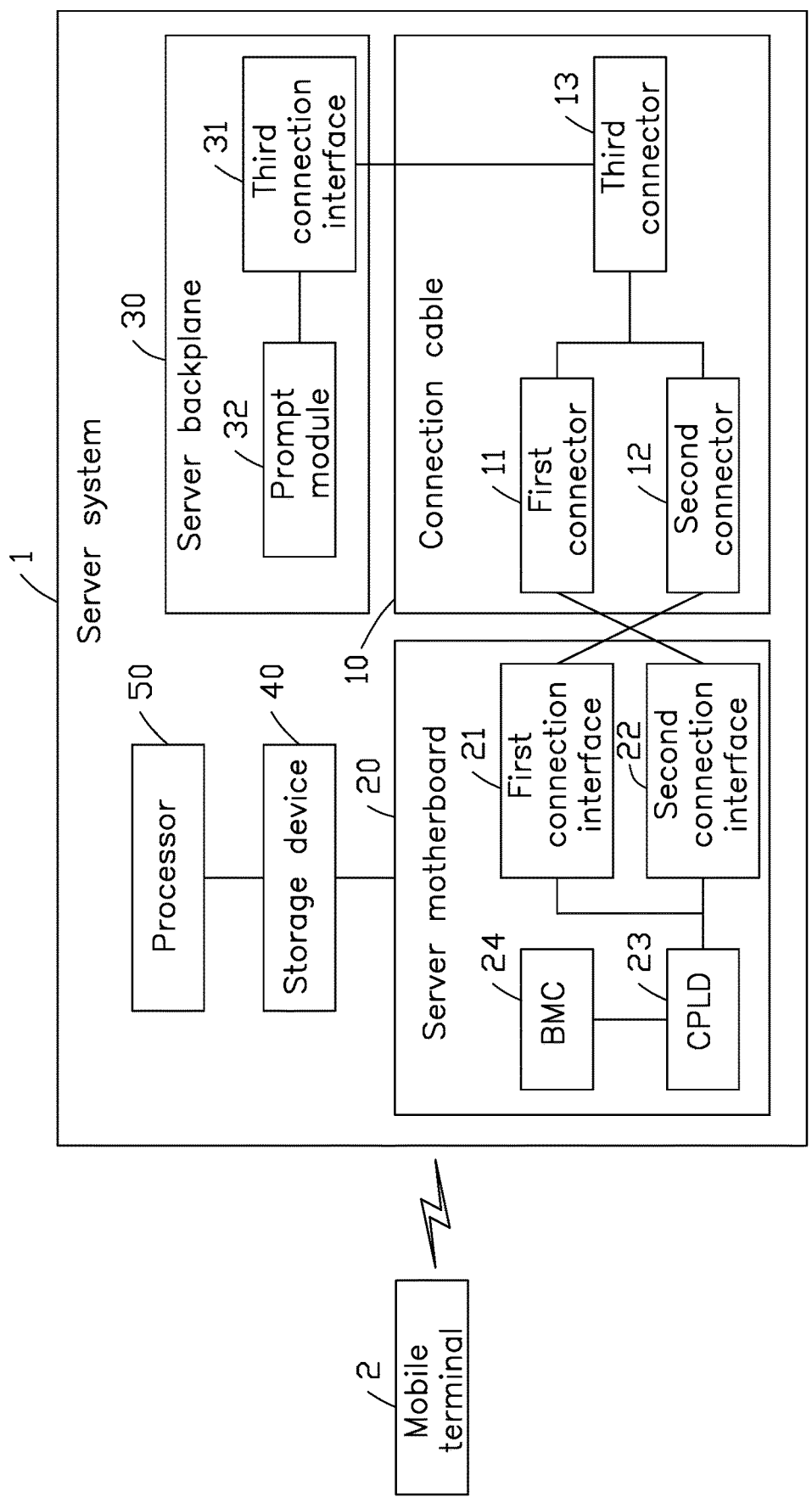
FIG. 3 is a schematic diagram showing an incorrect connection of cables in the server system according to an embodiment of the present disclosure.

FIG. 3 is a schematic diagram of the incorrect connection of the connection cable 10 in accordance with an embodiment of the present disclosure. When the connection cable 10 is incorrectly connected, for example, the first connection interface 21 is connected to the second connector 12, and the second connection interface 22 is connected to the first connector 11. When the server motherboard 20 is powered on, the CPLD 23 reads the four-bit binary as 0110. The CPLD 23 determines that the read four-bit binary 1001 is inconsistent with the preset signal (1001) configured by server system 1, indicating that the connection cable 10 is connected incorrectly. Therefore, the CPLD 23 does not run the server backplane 30, and the BMC 24 sends a warning signal to the prompt module 32. When the prompt module 32 receives the signal, the prompt module 32 displays the second state. For example, the prompt module 32 emits light. Meanwhile, the BMC 24 can send the signal to mobile terminal 2.

In some embodiments, for cost control and actual configuration requirements, when the server system 1 is running, the server motherboard 20 may only need to use a connection interface and connect it to the server backplane 30 through the connection cable 10. The server motherboard 20 only needs to select a corresponding connector in the connection cable 10 to connect.

Figure 4:
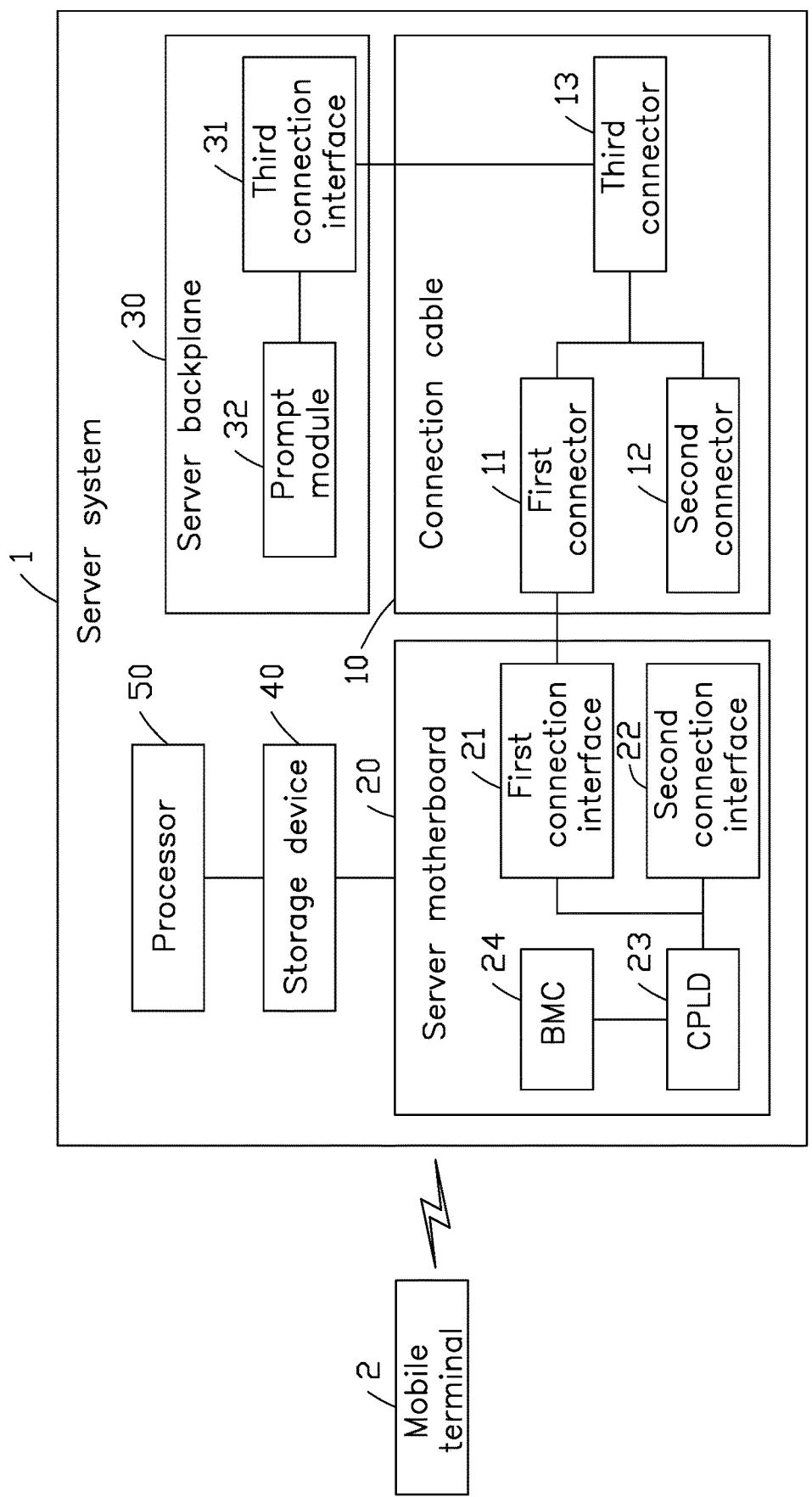
FIG. 4 is a schematic diagram shows a connection between a server motherboard and a server backplane according to an embodiment of the present disclosure.

For example, referring to FIG. 4, another connection state diagram of the server motherboard 20 and the server backplane 30 is shown, of an embodiment of the present disclosure.

Suppose that the first connector 11 is connected to the first connection interface 21, the third connector 13 is connected to the third connection interface 31, and the second connector 12 is not connected to the second connection interface 22, the connection between the server motherboard 20 and the server backplane 30 is completed. Therefore, the server system 1 can set the preset signal to binary 10.

In the embodiment, when the first connector 11 is connected to the first connection interface 21, the binary ID read by the CPLD 23 is 10, which is consistent with the preset signal (10), indicating that the 10 is correctly connected, and then the CPLD 23 controls the operation of the server backplane 30. At the same time, the prompt module 32 displays the first state, for example, the prompt module 32 does not emit light.

When the second connector 12 is selected to connect to the first connection interface 21, the binary ID read by the CPLD 23 is 01, which is inconsistent with the preset signal (10), indicating that the connection cable 10 is connected incorrectly, and the CPLD 23 controls the server backplane 30 to not work. The BMC 24 sends a warning signal to prompt module 32. When the prompt module 32 receives the signal, the prompt module 32 displays the second state, for example, the prompt module 32 emits light.

Figure 5:
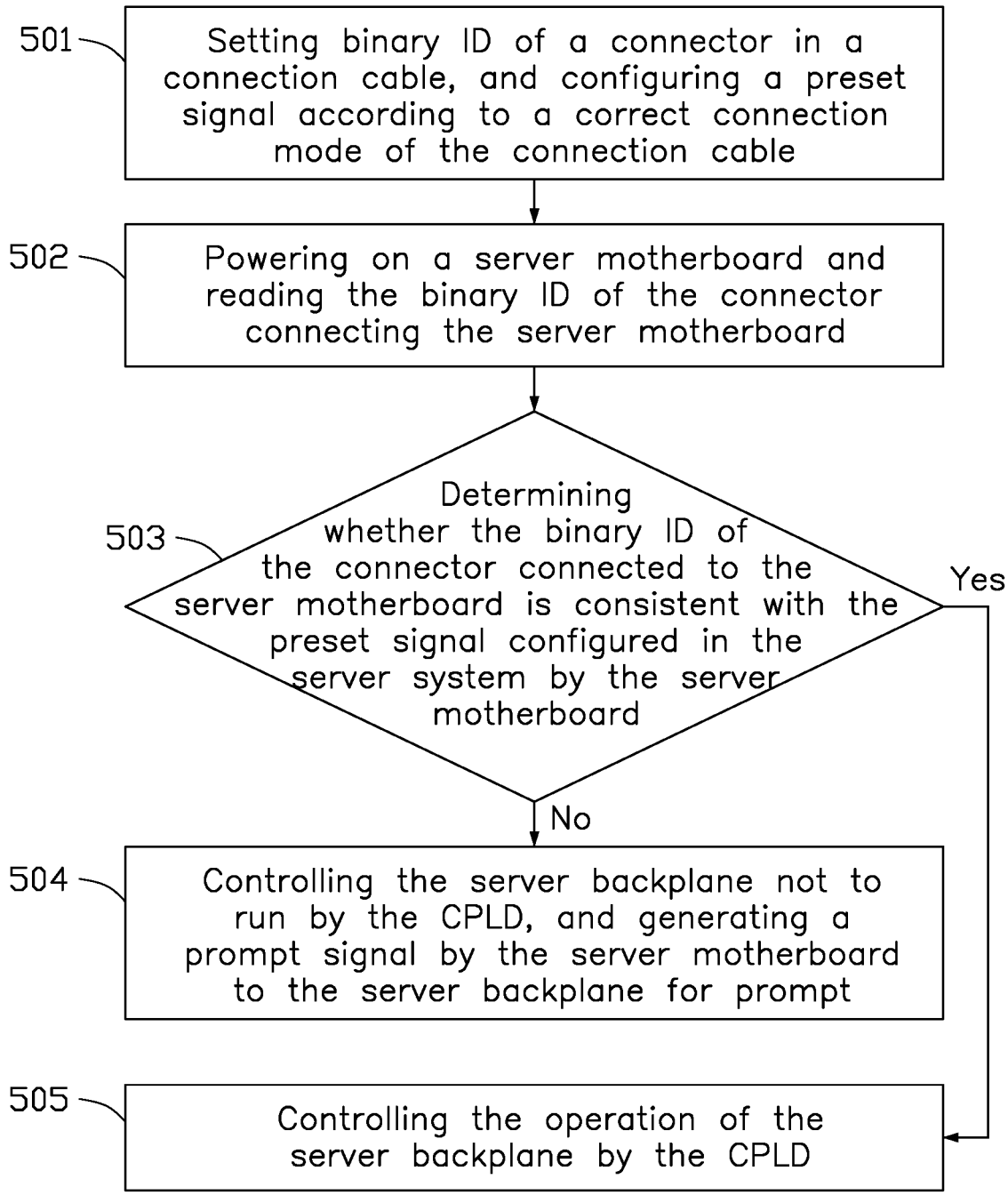
FIG. 5 is a flowchart of a method of detecting connections in a server system according to an embodiment of the present disclosure.

FIG. 5 is a flowchart depicting an embodiment of a server system detection method. The server system detection method is used to detect the cable connection state in the server system.

Each block shown in FIG. 5 represents one or more processes, methods, or subroutines, carried out in the example method. Furthermore, the illustrated order of blocks is illustrative only and the order of the blocks can change. Additional blocks can be added or fewer blocks may be utilized, without departing from the present disclosure. The example method can begin at block 501.

At block 501, setting binary ID of a connector in a connection cable 10, and configuring a preset signal associated with a correct connection mode of the connection cable 10.

At block 502, powering on a server motherboard 20 and reading the binary ID of the connector connecting the server motherboard 20.

For example, as shown in FIG. 2, the binary ID of the first connector 11 can be set to binary 10, and the binary ID of the second connector 12 can be set to binary 01, and the preset signal can be configured as four-bit binary 1001 according to the correct connection state of the connection cable 10 when the first connection interface 21 connects to the first connector 11 and the second connection interface 22 connects to the second connector 12.

As shown in FIG. 4, the binary ID of the first connector 11 can be set to binary 10, and the preset signal can be configured as four-bit binary 10 according to the correct connection state of the connection cable 10 when the first connection interface 21 connects to the first connector 11.

At block 503, determining whether the binary ID of the connector connected to the server motherboard 20 is consistent with the preset signal configured in the server system 1 by the server motherboard 20. If the binary ID of the connector connected to the server motherboard 20 is inconsistent with the preset signal configured in the server system 1, block 504 is implemented, otherwise block 505 is implemented.

When the server motherboard 20 determines that the binary ID of the connector connected to the server motherboard 20 is inconsistent with the preset signal, this indicates that the connection cable 10 is connected incorrectly. When the server motherboard 20 determines that the binary ID of the connector connected to the server motherboard 20 is consistent with the preset signal, this indicates that the connection cable 10 is connected correctly.

At block 504, controlling the server backplane 30 not to run by the CPLD 23, and generating a warning signal by the server motherboard 20 to the server backplane 30.

At block 505, controlling the operation of the server backplane 30 by the CPLD 23.

In some embodiments, when the server system 1 is connected to the mobile terminal 2, block 504 also includes:

Sending the warning signal to the mobile terminal 2.

It can be understood that the server system detection method provided by the embodiment of the present disclosure can be stored in the server system 1 by writing a script (program code or instructions) in advance, and the server system detection method can be realized by executing the detection script.

It can be understood that in order to compare the binary ID of the connector and the preset signal in the server, the correct information of the connector to be connected to each connection port on the server motherboard 20 should be stored in the configuration of the server system 1 in advance.

Referring again to FIG. 2, the server system 1 also includes a storage device 40 and a processor 50. The storage device 40 is used to store program code or a plurality of instructions, and various data. For example, the storage device 40 may be used to store the binary ID of the connector on the connection cable 10. The processor 50 can also perform various functions and process data of the server system 1 by calling up program codes and various data stored in the storage device 40. For example, the processor 50 can control the function of the BMC 24 to send prompt signals. For example, the processor 50 may configure a preset signal according to the correct connection state of the connection cable 10.

The storage device 40 may include read only memory (ROM), random access memory (RAM), programmable read only memory (PROM), erasable programmable read only memory (EPROM), one time programmable read only memory (OTPROM) Electrically erasable programmable read only memory (EEPROM), compact disc read only memory (CD-ROM) or other optical disk memory, magnetic disk memory, magnetic tape memory, or any other computer-readable medium that can be used to carry or store data.

The processor 50 may include integrated circuits, for example, a single packaged integrated circuit, or a plurality of integrated circuits with the same or different function packages, including microprocessors, digital processing chips, graphics processors, and combinations of various control chips.

The embodiment of the present disclosure also provides a storage medium. The storage medium includes a number of instructions for causing a computer device (which may be a personal computer, a terminal, or a network device) or a processor to execute a portion of the method described in each embodiment of the present disclosure.

In the present disclosure, the binary ID is set at the connector of the connection cable 10, and the preset signal is set in the server system 1 according to the correct connection state of the connection cable. The present disclosure determines whether the connection cable 10 is connected correctly by comparing the binary ID of the connector connected on the server motherboard 20 with the preset signal. When the connection cable 10 is connected incorrectly, the BMC 24 will send a warning signal and the display state of the prompt module 32 will warn the staff, so that the connection state of the cable can be immediately changed to avoid problems in the operation of the server system 1.

Those of ordinary skill in the art should realize that the above embodiments are only used to illustrate the present disclosure, but not to limit the present disclosure. As long as they are within the essential spirit of the present disclosure, the above embodiments are appropriately made and changes fall within the scope of protection of the present disclosure.

What is claimed is:

1. A server system comprising:
    a server motherboard;
    a connection cable;
    a server backplane electrically connected to the server motherboard through the connection cable;
    wherein the connection cable comprises a first connector and a second connector, the first connector and the second connector are configured to connect to the server motherboard, the first connector and the second connector are respectively set with different binary IDS, and the server motherboard is configured to determine whether the connection cable is correctly connected according to the binary ID; and
    wherein the server motherboard comprises a first connection interface and a second connection interface, when the first connection interface is connected to the first connector and the second connection interface is connected to the second connector, the connection cable is in a correct connection state, and the server motherboard is configured to configure a preset signal according to the correct connection state of the connection cable.

2. The server system of claim 1, wherein the server motherboard is further configured to compare the binary ID and the preset signal, and determine whether the connection cable is connected correctly.

3. The server system of claim 2, wherein the server motherboard comprises a complex programmable logic device (CPLD), the CPLD is configured to read the binary ID of a connector connected to the server motherboard and determine whether the binary ID of the connector connected to the server motherboard is consistent with the preset signal.

4. The server system of claim 3, wherein when the binary ID of the connector connected to the server motherboard is consistent with the preset signal, the CPLD determines that the connection cable is connected correctly and controls operation of the server backplane.

5. The server system of claim 4, wherein when the binary ID of the connector connected to the server motherboard is inconsistent with the preset signal, the CPLD determines that the connection cable is connected incorrectly and controls the server backplane not to run.

6. The server system of claim 3, wherein the server motherboard further comprises a baseboard management controller (BMC), the BMC is configured to send a prompt signal when the CPLD determines that the binary ID of the connector connected to the server motherboard is inconsistent with the preset signal and transmit the prompt signal to the server backplane.

7. The server system of claim 6, wherein the server backplane comprises a prompt module, the prompt module is configured to receive the prompt signal and display different states according to whether the prompt signal is received.

8. The server system of claim 7, wherein when the prompt module does not receive the prompt signal, the prompt module displays a first state.

9. The server system of claim 8, wherein when the prompt module receives the prompt signal, the prompt module displays a second state.

10. The server system of claim 6, wherein the BMC is connected to a mobile terminal, and the BMC is configured to send a prompt signal to the mobile terminal when the binary ID of the connector connected to the server motherboard is inconsistent with the preset signal.

11. A server system comprising:
a server motherboard;
a connection cable;
a server backplane electrically connected to the server motherboard through the connection cable;
wherein the connection cable comprises a first connector and a second connector, the first connector and the second connector are configured to connect to the server motherboard, the first connector and the second connector are respectively set with different binary IDS, and the server motherboard is configured to determine whether the connection cable is correctly connected according to the binary ID; wherein the server motherboard comprises a first connection interface and a second connection interface, when the first connection interface is connected to the first connector and the second connection interface is connected to the second connector, the connection cable is in a correct connection state, and the server motherboard is configured to configure a preset signal according to the correct connection state of the connection cable, the server motherboard is configured to compare the binary ID and the preset signal, and determine whether the connection cable is connected correctly;
wherein the server motherboard comprises a complex programmable logic device (CPLD), the CPLD is configured to read the binary ID of a connector connected to the server motherboard and determine whether the binary ID of the connector connected to the server motherboard is consistent with the preset signal; and
wherein when the binary ID of the connector connected to the server motherboard is consistent with the preset signal, the CPLD determines that the connection cable is connected correctly and controls operation of the server backplane.

12. The server system of claim 11, wherein when the binary ID of the connector connected to the server motherboard is inconsistent with the preset signal, the CPLD determines that the connection cable is connected incorrectly and controls the server backplane not to run.

13. The server system of claim 12, wherein the server motherboard further comprises a baseboard management controller (BMC), the BMC is configured to send a prompt signal when the CPLD determines that the binary ID of the connector connected to the server motherboard is inconsistent with the preset signal and transmit the prompt signal to the server backplane.

14. The server system of claim 12, wherein the server backplane comprises a prompt module, the prompt module is configured to receive the prompt signal and display different states according to whether the prompt signal is received.

15. The server system of claim 14, wherein when the prompt module does not receive the prompt signal, the prompt module displays a first state.

16. The server system of claim 15, wherein when the prompt module receives the prompt signal, the prompt module displays a second state.

17. The server system of claim 13, wherein the BMC is connected to a mobile terminal, and the BMC is configured to send a prompt signal to the mobile terminal when the binary ID of the connector connected to the server motherboard is inconsistent with the preset signal.

18. A server system detection method comprising:
setting a binary ID of a connector in a connection cable;
determining whether the connection cable is connected correctly according to the binary ID; and
wherein the determining whether the connection cable is connected correctly according to the binary ID, further comprises:
configuring a preset signal according to a correct connection state of the server motherboard and the connection cable and the binary ID.

19. The server system detection method of claim 18, wherein the determining whether the connection cable is connected correctly according to the binary ID, further comprises:
reading the binary ID of the connector connecting the server motherboard and comparing the binary ID with the preset signal, and determining whether the connection cable is connected correctly when a server motherboard is powered on; and
wherein when the binary ID is consistent with the preset signal, the connection cable is connected correctly; when the server motherboard determines that the binary ID of the connected connector is inconsistent with the preset signal, a BMC of the server motherboard sends a prompt signal.

20. The server system detection method of claim 19, further comprising:
determining the connection cable is connected correctly and controlling operation of a server backplane when the binary ID of the connector connected to the server motherboard is consistent with the preset signal; and
determining the connection cable is connected incorrectly and controlling the server backplane not to run when the binary ID of the connector connected to the server motherboard is inconsistent with the preset signal.

* * * * *